UNITED STATES PATENT OFFICE.

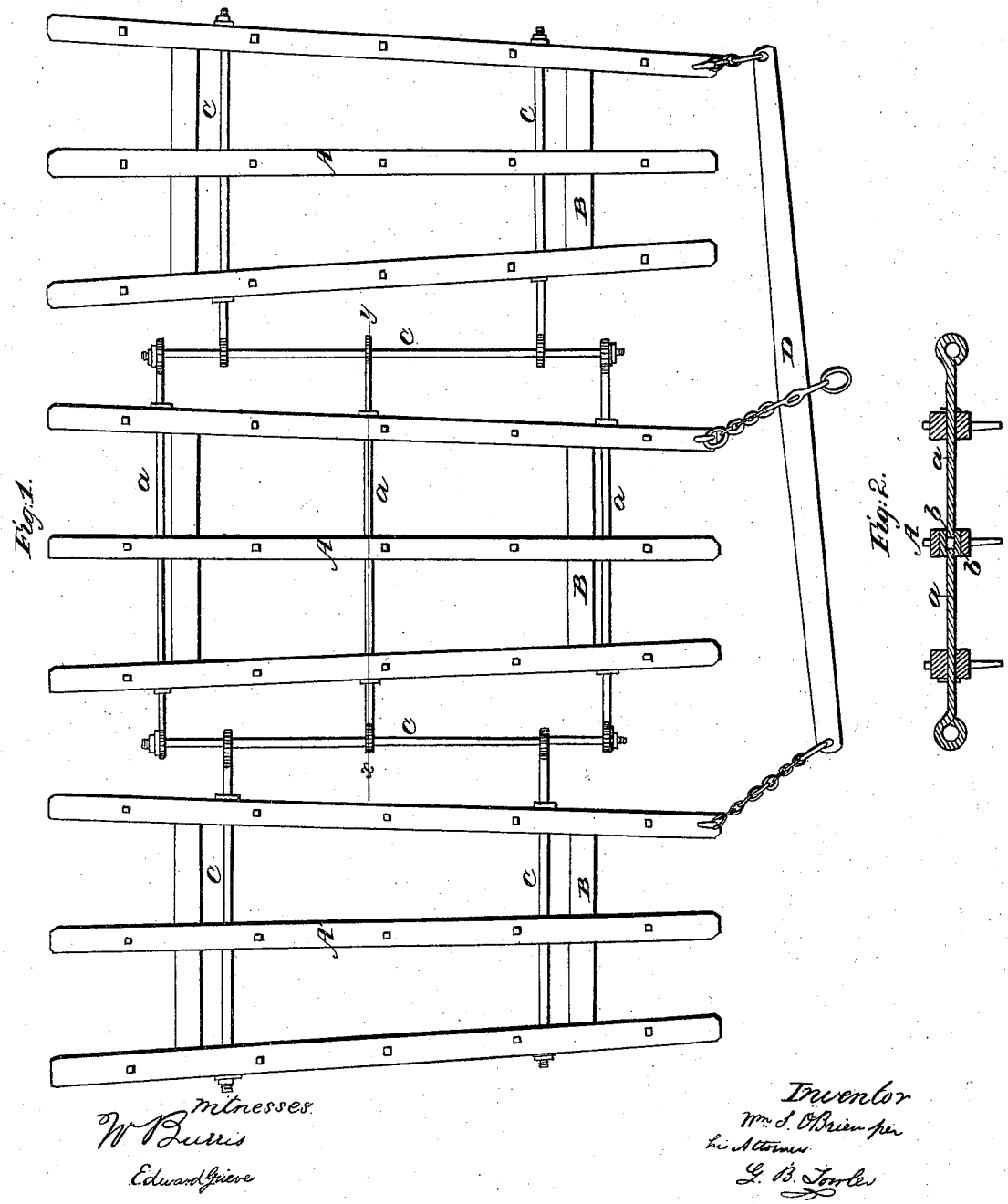

WILLIAM S. O'BRIEN, OF BRIMFIELD, ILLINOIS.

IMPROVEMENT IN HARROWS.

Specification forming part of Letters Patent No. 55,351, dated June 5, 1866.

*To all whom it may concern:*

Be it known that I, WILLIAM S. O'BRIEN, of Brimfield, Peoria county, State of Illinois, have invented a new and useful Improvement in Harrows; and I do hereby declare the following description and accompanying drawings are sufficient to enable any person skilled in the art or science to which it most nearly appertains to make and use my said invention or improvements without further invention or experiment.

The nature of my invention and improvements consists in constructing three harrow-frames of a tapering or trapezoid form, so that when coupled together and drawn in the proper direction the front or forward teeth, attached thereto, will be thrown out of a direct line with the rear ones, and each forward tooth will thereby be intervened between each rear one, thus approximating the teeth sufficiently close in equidistant parallel lines as to effectually break the clods or level the plowed ground, or for whatever purpose desired.

My invention further consists in providing the center longitudinal beam of the middle harrow with screw-nuts inserted in openings made through the side of the beams, whereby the ends of the eye-rods may be more conveniently secured to the said screw-nuts than in having them of one piece and applied differently, which if made whole the eyes could only be formed on one end, the other having to be straight to enable them to be introduced through the beams, and the eyes then formed, which only can be done at great inconvenience, whereas having the rods in two pieces and the ends thereof secured to the same screw-nut, the eyes of both the other ends are thus enabled to be constructed to advantage before applying them to the harrow, and at the same time, when desired, the rods when applied may be lengthened or shortened, as occasion may require, to receive the longitudinal rod passed through the eyes, and the eyes of the rods attached to the outer harrow on each side to couple the whole together, which is done by unscrewing or screwing the rods in the screw-nuts.

Figure 1 is a plan view of my improved harrow; Fig. 2, transverse section of middle harrow, as indicated by the line $x\,y$ in Fig. 1, showing the location of the screw-nuts in center beam and the attachment of the eye-rods thereto and therein, as herein mentioned.

Like letters in both figures of the drawings indicate like parts.

My improved harrow comprises three frames, A' A A', constructed of suitable material and of the ordinary size, except that they taper or incline inwardly from the rear to the forward parts of them, for the purpose as hereinbefore stated, the front transverse beams, B B B, being simply made shorter in length than the rear ones.

In the center harrow, A, three eye-rods, $a\,a\,a$, are used. They are introduced through holes first made in the sides of the longitudinal beams constituting the frame, and then inserted in the screw-nuts $b$, which are properly secured in openings made in the center beam to receive them. (See Fig. 2.) The rods are so bent as to have eyes formed at one end of them, the other ends having screw-threads thereon to fit into the screw-nuts, as above described. The outer harrows, A' A', have only two eye-rods, $c\,c$, each passing through the beams and properly secured by screw-nuts. The three harrows are coupled together by the longitudinal rods C passing through the eyes, being headed at one of their ends to prevent their slipping through, and provided with screw-nuts at the other ends to secure the same.

D represents the double-tree attached to the frames by chains secured to hooks fastened thereon, and so arranged as to allow the harrows to be drawn in a direction oblique to a line with the longitudinal beams of the harrow, and thus effect an intervention of the forward teeth between each of the rear ones, for the purpose as herein described. The arrangement of the rods are such as to admit of a free play on the longitudinal ones, so that in the event of any obstructions being met with by the teeth an abrupt contact of the eye-rods with one another is thereby prevented.

In order to be more particularly understood, it will be observed that by the arrangement and attachment of the eye-rods to the screw-nuts the forward portion of the outer harrows may be readily adjusted, so as to bring them closer to the center harrow or extend them out for the purpose of running the teeth in close or wider parallel lines, as may be desired, which is done by turning the two forward rods, the longitudinal ones being first slipped back out of the eyes.

Having thus fully described my invention, what I claim therein as new, and desire to secure by Letters Patent, is—

The arrangement and attachment of the eye-rods $a\,a\,a$ to the screw-nuts $b$ in the center harrow, for the securing and adjustment of the outer harrows, A' A', substantially in the manner and for the purpose as herein described.

WILLIAM S. O'BRIEN.

Witnesses:
   JAMES ARMSTRONG,
   JOSEPH ARMSTRONG, Jr.